US009428935B2

(12) United States Patent
Yamashita

(10) Patent No.: US 9,428,935 B2
(45) Date of Patent: Aug. 30, 2016

(54) DRIVING DEVICE OF VEHICLE DOOR LATCH UNIT

(71) Applicant: MITSUI KINZOKU ACT CORPORATION, Kanagawa (JP)

(72) Inventor: Kohei Yamashita, Kanagawa (JP)

(73) Assignee: MITSUI KINZOKU ACT CORPORATION, Kanagawa (JP)

( * ) Notice: Subject to any disclaimer, the term of this patent is extended or adjusted under 35 U.S.C. 154(b) by 0 days.

(21) Appl. No.: 14/585,836

(22) Filed: Dec. 30, 2014

(65) Prior Publication Data

US 2016/0062365 A1 Mar. 3, 2016

(30) Foreign Application Priority Data

Sep. 2, 2014 (JP) ................................ 2014-178598

(51) Int. Cl.
*H02P 3/00* (2006.01)
*E05B 1/00* (2006.01)

(52) U.S. Cl.
CPC ...................................... *E05B 1/00* (2013.01)

(58) Field of Classification Search
CPC ............. E05B 81/34; Y10T 292/1047; Y10T 292/1082; Y10T 292/699; Y10T 292/1046
USPC ......................................................... 318/468
See application file for complete search history.

(56) References Cited

U.S. PATENT DOCUMENTS 5,632,120 A * 5/1997 Shigematsu ............ E05B 81/20 292/DIG. 23
5,722,706 A * 3/1998 Bartel .................. E05B 85/045 200/61.64
6,048,002 A * 4/2000 Ohta ....................... E05B 81/20 292/201
6,065,315 A * 5/2000 Hoshikawa ............... H02P 5/68 292/201
6,669,247 B2 * 12/2003 Swan ...................... E05B 81/14 292/201
6,698,804 B2 * 3/2004 Shiota ..................... E05B 81/20 292/201
7,380,844 B2 * 6/2008 Berghahn ................ E05B 81/20 292/201
8,870,246 B2 * 10/2014 Itami ....................... E05B 81/20 292/201
2009/0079206 A1 * 3/2009 Hunt ....................... E05B 81/06 292/216
2013/0127246 A1 * 5/2013 Herrmann ............... E05B 85/26 307/10.1

FOREIGN PATENT DOCUMENTS

JP 2005-248485 A 9/2005
JP 2014-009477 A 1/2014

* cited by examiner

*Primary Examiner* — Eduardo Colon Santana
*Assistant Examiner* — Gabriel Agared
(74) *Attorney, Agent, or Firm* — McDermott Will & Emery LLP

(57) ABSTRACT

A driving device includes: a neutral switch switches over from ON to OFF when an automatic closing function by a motor is operated and a first cam surface is released from a contact with the neutral switch; and a gear detection switch switches over from ON to OFF when an automatic closing function by the motor is operated and a second cam surface is released from a contact with the gear detection switch, wherein the operation of the automatic closing function by the motor is configured to be initiated by switch-over of a ratchet switch of the door latch unit from OFF to ON and ended by switch-over of the neutral switch from OFF to ON, and the gear detection switch is configured to switch over from OFF to ON by coming into contact with the second cam surface when the automatic releasing function by the motor is operated.

1 Claim, 8 Drawing Sheets

DRIVING DEVICE OF VEHICLE DOOR LATCH UNIT

CROSS-REFERENCE TO RELATED APPLICATIONS

The present application claims priority to and incorporates by reference the entire contents of Japanese Patent Application No. 2014-178598 filed in Japan on Sep. 2, 2014.

BACKGROUND OF THE INVENTION

1. Field of the Invention

The present invention relates to a vehicle door latch unit, and in particular, to a driving device of the latch unit.

2. Description of the Related Art

A conventionally well known latch unit includes a latch that engages with a striker and a ratchet that engages with the lath and holds the engagement between the latch and the striker, and in the latch unit, a driving device (a device having an automatic closing function, hereinafter also referred to as "automatic closing mechanism") that rotates the latch by a motor power from a half latch position to a full latch position is associatively connected to the latch, and a driving device (a device having an automatic releasing function, hereinafter also referred to as "automatic releasing mechanism") that rotates the ratchet by a motor power in a door opening direction (a direction in which the engagement with the latch is released) to bring a door into an openable state is associatively connected to the ratchet (for example, see Japanese Patent Application Laid-open No. 2014-009477, and see Japanese Patent Application Laid-open No. 2005-248485 for a latch unit including an automatic closing mechanism).

For control of the driving devices, signals from a plurality of switches are used. The plurality of switches are broadly classified into a driven side switch group that detects states (positions) of the latch and ratchet of the latch unit and a driving side switch group that detects a state (position) of a driving mechanism that rotates the latch and ratchet by a motor power.

A latch switch that detects an unlatch position, a half latch position, a full latch position, and the like of the latch and a ratchet switch that detects, for example, whether or not the ratchet has rotated to a position where the ratchet is able to engage with the latch correspond to the driven side switch group. A gear switch or the like that detects, for example, whether the driving mechanism, such as a sector gear, which is rotated by the motor power, is at a neutral position (initial position) or at an operation completion position corresponds to the driving side switch group.

Types and the numbers of the plurality of switches that are used vary, and methods of processing the signals from the plurality of switches also vary, depending on design concepts of the latch unit/driving mechanism, and in any case, durability of the switches and downsizing the cam body for turning the switches ON or OFF have been ongoing problems in the designing.

SUMMARY OF THE INVENTION

It is an object of the present invention to at least partially solve the problems in the conventional technology.

According to one aspect of the present invention, there is provided a driving device of a door latch unit, the driving device including: a neutral switch that switches over from ON to OFF, when an automatic closing function by a motor is operated and a first cam surface is released from a contact with the neutral switch; and a gear detection switch that switches over from ON to OFF, when an automatic closing function by the motor is operated and a second cam surface is released from a contact with the gear detection switch, wherein the operation of the automatic closing function by the motor is configured to be initiated by switch-over of a ratchet switch of the door latch unit from OFF to ON, the operation of the automatic closing function by the motor is configured to be ended by switch-over of the neutral switch from OFF to ON, and the gear detection switch is configured to switch over from OFF to ON by coming into contact with the second cam surface again when the automatic releasing function by the motor is operated.

The second cam surface according to another aspect of the present invention may be set at a height where the second cam surface does not come into contact with the neutral switch and the second cam surface may extends from an end portion of the first cam surface.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
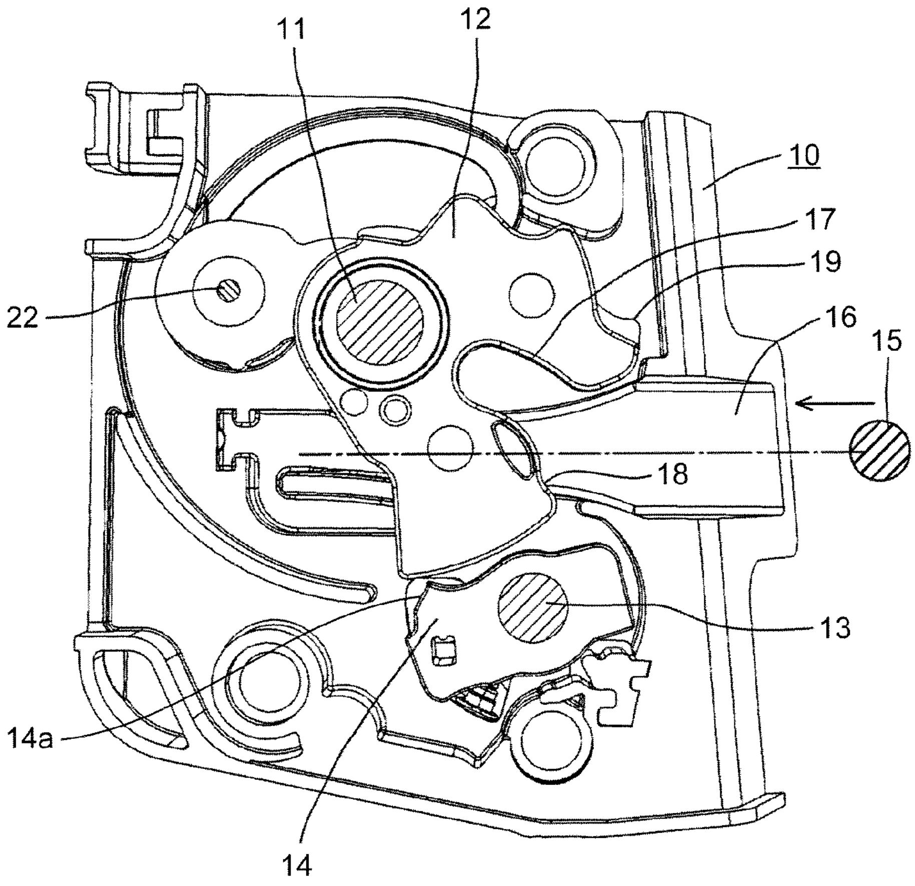
FIG. 1 is a front view of a latch unit of a door latch device to which a driving device, which is an embodiment of the present invention, is applied.

An embodiment of the present invention will be described. As illustrated in FIG. 1, onto a latch body 10 of a latch unit (latch device), the latch body 10 being formed of a synthetic rein or the like, a latch 12 is pivotally supported by a latch shaft 11 and a ratchet 14 is pivotally supported by a ratchet shaft 13. The latch 12 has an engagement groove 17, a half latch engagement portion 18, and a full latch engagement portion 19. The engagement groove 17 is formed from an outer peripheral surface of the latch 12 towards the latch shaft 11 and has a width that is able to accommodate a striker 15. The half latch engagement portion 18 is formed, as illustrated in FIG. 1, at a portion positioned on a left side of an opening edge portion of the latch 12 in the engagement groove 17. This half latch engagement portion 18 is configured to lock the latch 12 by engaging with the ratchet 14 when the latch 12 is caused to be rotated in a clockwise direction and brought to a half latch position. The full latch engagement portion 19 is formed as a concave portion on the outer peripheral surface of the latch 12. This full latch engagement portion 19 is configured to lock the latch 12 by engaging with the ratchet 14 when the latch 12 is rotated in the clockwise direction and brought to a full latch position.

The ratchet 14 has a claw part 14*a*. The claw part 14*a* is formed so as to protrude towards the latch 12, at a radial direction end portion of the ratchet 14. The ratchet 14 is engageable with the half latch engagement portion 18 and the full latch engagement portion 19 of the latch 12 via that protruded portion when the ratchet 14 is rotated in the clockwise direction. The ratchet 14 is continuously biased in the clockwise direction by a spring elastic force.

When a door moves to be closed, the striker 15 fixed to a vehicle body relatively advances into an advancement passage 16 formed in the latch body 10, engages with the engagement groove 17 of the latch 12, and causes the latch 12 at an unlatch position to be rotated in the full latch direction (clockwise direction). When the latch 12 is brought to the half latch position, the ratchet 14 is rotated in the clockwise direction by the spring elastic force and the claw part 14*a* and the half latch engagement portion 18 of the latch 12 become engageable with each other. Further, when the latch 12 is brought to the full latch position, the claw part 14*a* and the full latch engagement portion 19 of the latch 12 become engageable with each other. When the claw part 14*a* of the ratchet 14 engages with the full latch engagement portion 19 of the latch 12, the door closing operation is complete and the door is maintained in a closed-door state.

Figure 2:
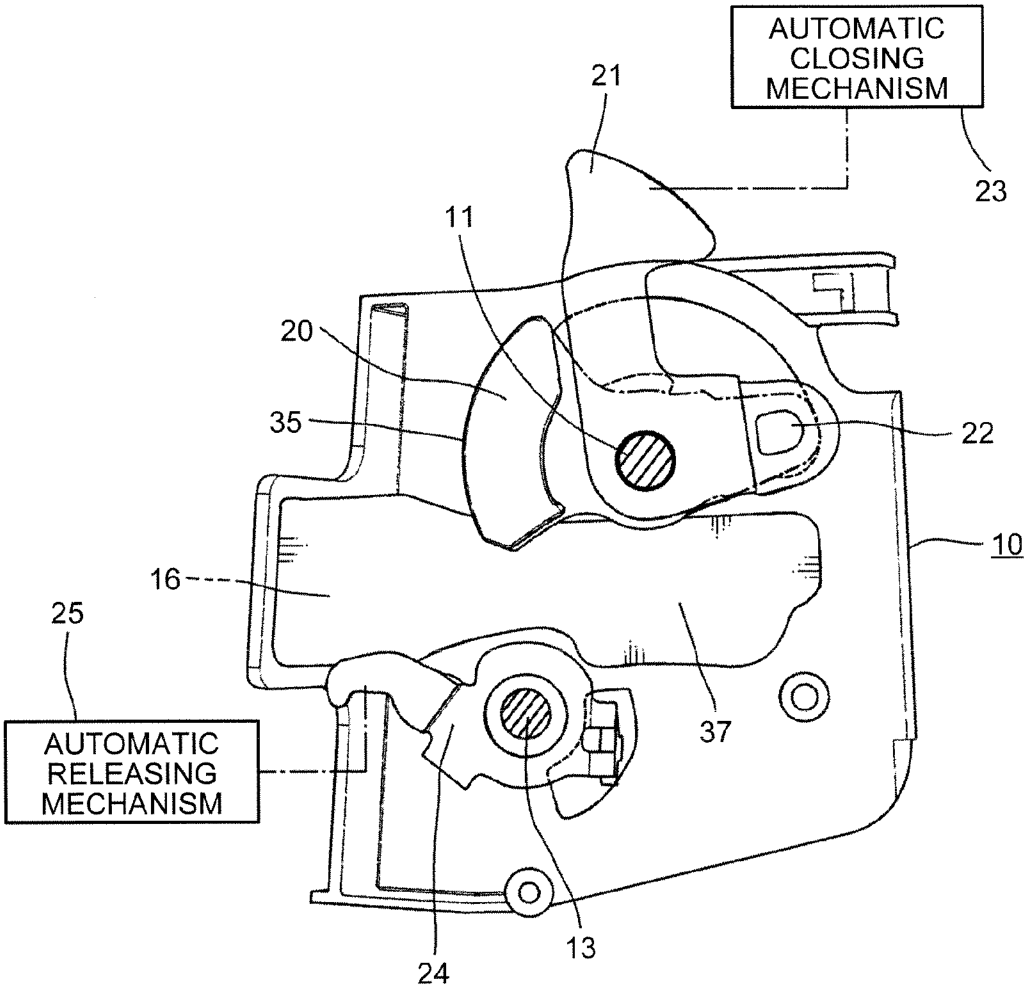
FIG. 2 is a rear view of the latch unit of FIG. 1 with a part thereof being omitted.
Figure 4:
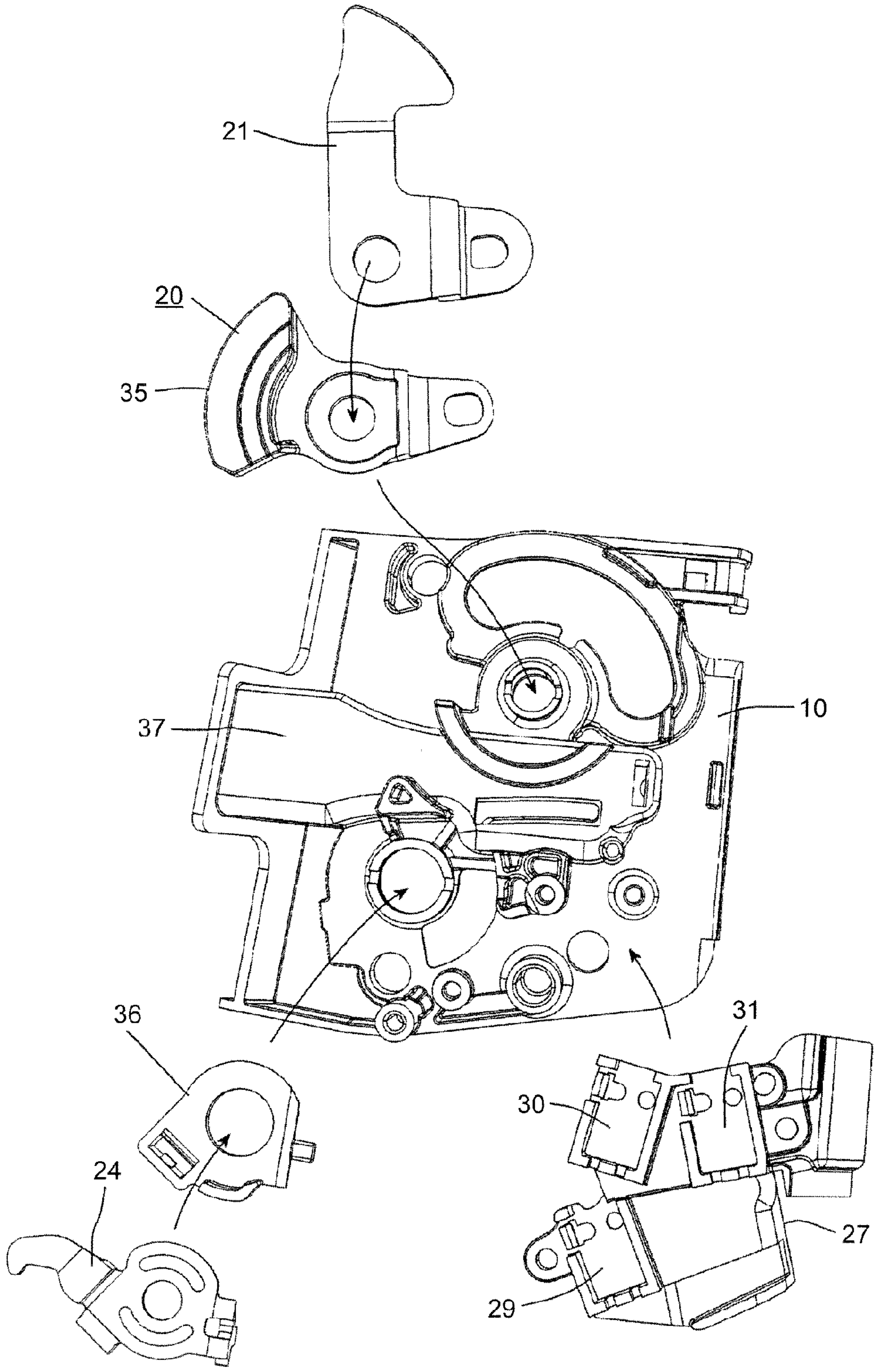
FIG. 4 is an exploded view of a rear face side of the latch unit.

FIG. 2 illustrates a rear face of the latch unit. At an end portion of the latch shaft 11, a latch switch lever 20 and an automatic closing lever 21 as illustrated in FIG. 4 are installed. The latch switch lever 20 and the automatic closing lever 21 rotate integrally and in association with the latch 12, and in this embodiment, the latch switch lever 20 and the automatic closing lever 21 are coupled to each other by a coupling pin 22 penetrating through the Latch body 10 and associatively rotate about the latch shaft 11.

A conventionally well known motor-type automatic closing mechanism 23 is associatively coupled to the automatic closing lever 21. When the automatic closing lever 21 is rotated by a motor power of the automatic closing mechanism 23, the latch 12 at the half latch position is rotated by the motor power to the full latch position.

At an end portion of the ratchet shaft 13, a ratchet lever 24 that rotates in association with the ratchet 14 is provided. The ratchet lever 24 preferably is made of a metal plate, and is able to operate in association with the ratchet 14 by a part of the ratchet lever 24 being bent and engaged with the ratchet 14. The ratchet lever 24 is associatively coupled to an open handle (not illustrated) of a door. When the ratchet lever 24 is rotated by a door opening operation of the open handle, the ratchet 14 is rotated in a door opening direction (anticlockwise direction in FIG. 1) and is released from the engagement with the latch 12. When the ratchet 14 is released from the engagement with the latch 12, the door is brought into an openable state.

Further, a conventionally well known motor-type automatic releasing mechanism 25 is associatively coupled to the ratchet lever 24. The ratchet 14 is able to be released from the engagement with the latch 12 to bring the door into the openable state, also by a motor power of the automatic releasing mechanism 25.

Figure 3:
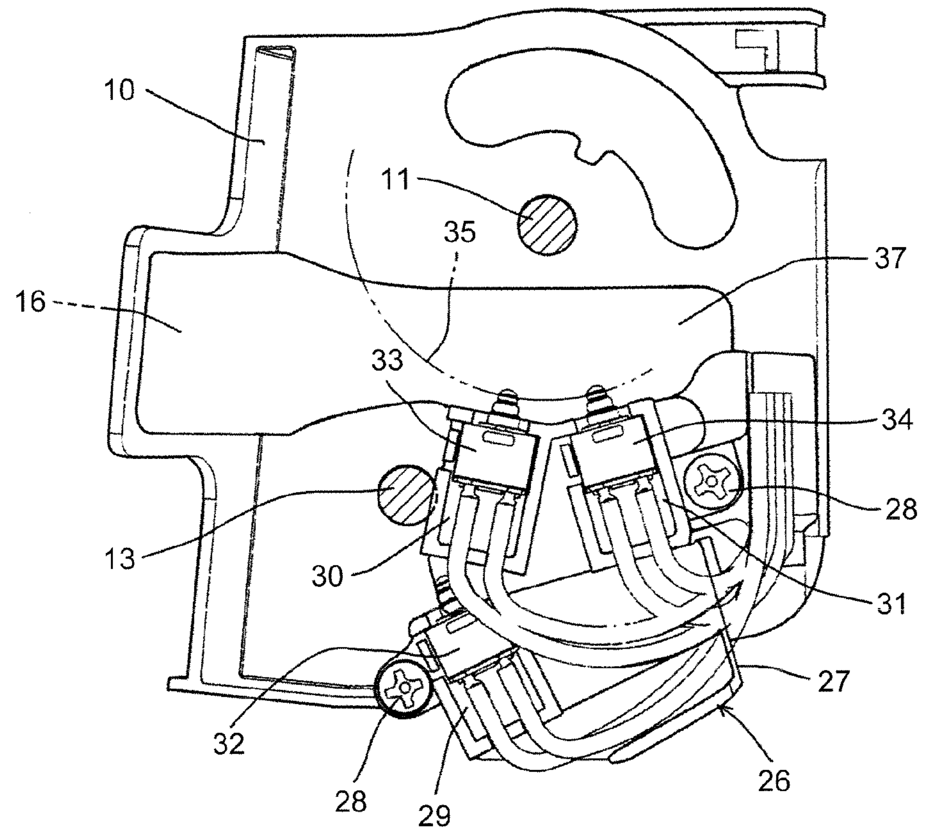
FIG. 3 is a rear view illustrating a state where a switch assembly of a driven side switch group has been installed in a latch body of the latch unit.

As illustrated in FIG. 3, at a lower portion of the latch body 10 on a rear face side thereof (a ratchet side on a rear face of the latch body 10), a switch assembly 26 of a driven side switch group is provided. The switch assembly 26 includes a switch case 27, and a ratchet switch 32 and latch switches (a half latch switch 33 and a full latch switch 34) that are installed in this switch case 27. The switch case 27 is made of, for example, a synthetic resin. The switch case 27 is fixed to the latch body 10 by a fixing means 28, such as a screw. Three switch accommodating portions 29, 30, and 31 are integrally formed with the switch case 27. The ratchet switch 32 is accommodated in the switch accommodating portion 29, the half latch switch 33 is accommodated in the switch accommodating portion 30, and the full latch switch 34 is accommodated in the switch accommodating portion 31. The switches 32, 33, and 34 are respectively accommodated in the switch accommodating portions 29, 30, and 31 beforehand to be separately manufactured as the assembly 26. The switch case 27 is fixed to the latch body 10 by the fixing means 28 with the switches 32, 33, and 34 having been respectively installed in the switch accommodating portions 29, 30, and 31.

The ratchet switch 32 detects a position of the ratchet 14. The latch switches detect positions of the latch 12, the half latch switch 33 detecting the half latch position of the latch 12 and the full latch switch 34 detecting the full latch position of the latch 12.

The half latch switch 33 and full latch switch 34 switch over from OFF to ON by coming into contact with a cam surface 35 (see FIG. 2 and FIG. 4) of the latch switch lever 20 that rotates in association with the latch 12. The cam surface 35 is formed on an outer peripheral surface of the latch switch lever 20. The positions of the latch 12 are detected by the cam surface 35 coming into contact with the latch switches 33 and 34 and the latch switches 33 and 34 switching over from OFF to ON, due to rotation of the latch switch lever 20. Further, the ratchet switch 32 switches over from OFF to ON by coming into contact with a ratchet switch lever 36 of FIG. 4 (see FIG. 4) that integrally rotates with the ratchet lever 24. The ratchet switch lever 36 is provided, together with the ratchet lever 24, at the end portion of the ratchet shaft 13. A position of the ratchet 14 is detected by the ratchet switch lever 36 coming into contact with the ratchet switch 32 and the ratchet switch 32 being switched over from OFF to ON. The switch case 27 is arranged substantially below a rear face side bulged portion 37 of the latch body 10, the rear face side bulged portion 37 zoning the advancement passage 16 in FIG. 3.

Figure 5:
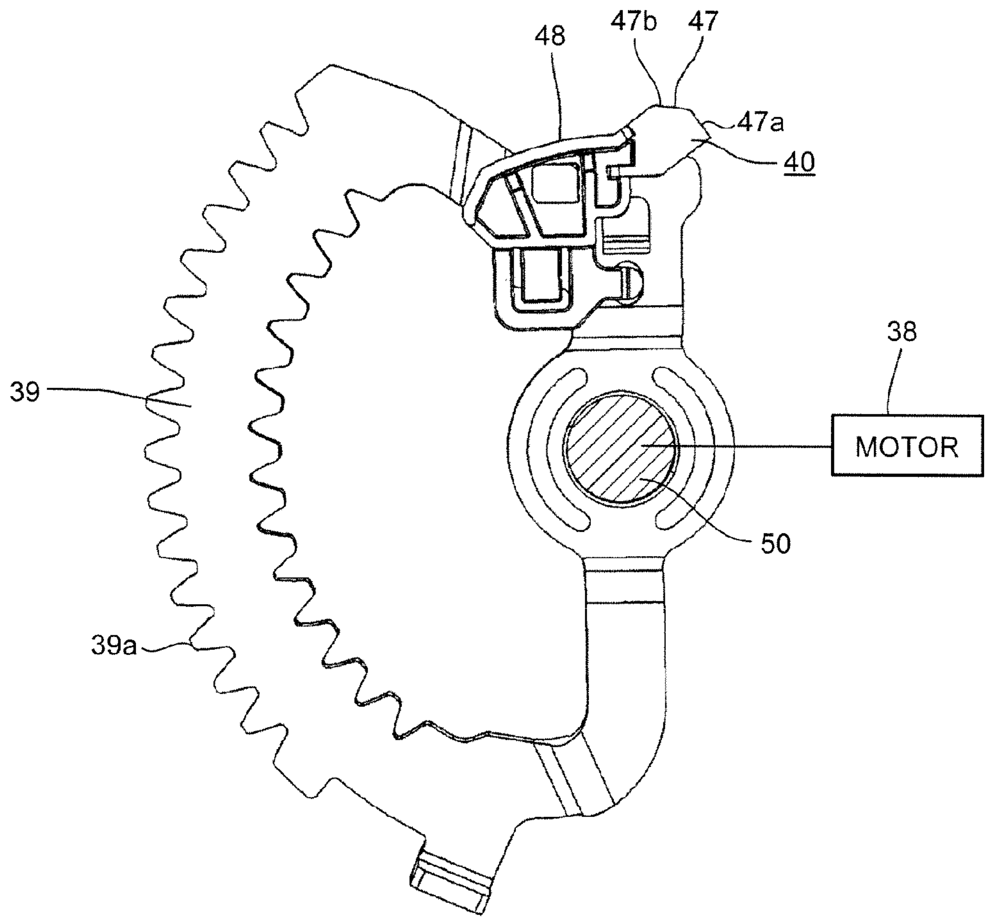
FIG. 5 is a front view of a sector gear of the driving device attached with a gear interlocking cam body.

A driving mechanism of this embodiment has the automatic closing mechanism 23 and the automatic releasing mechanism 25. This driving mechanism is driven by one common motor 38, and a sector gear 39 rotates normally (automatic closing rotation) from a neutral position by normal rotation of the motor 38 and the sector gear 39 rotates reversely (automatic releasing rotation) from the neutral position by reverse rotation of the motor 38. These configurations themselves are able to be substituted with conventional configurations and thus description of details of the configurations will be omitted. The driving mechanism of this embodiment has, as illustrated in FIG. 5, the motor 38 and the sector gear 39. The sector gear 39 is pivotally supported by a sector shaft 50. The sector gear 39 has a sector form and on a peripheral surface thereof, teeth 39*a* are formed. An output gear of the motor 38 is engaged with the teeth 39*a* of the sector gear 39, and by the motor 38 being driven, the sector gear 39 is rotated about the sector shaft 50. The sector gear 39 is configured to rotate the automatic closing lever 21 such that the latch 12 is rotated in the full latch direction when the sector gear 39 rotates (normally rotates) in one direction (clockwise direction in FIG. 5) from the neutral position and to rotate the ratchet lever 24 such that the ratchet 14 is rotated in a direction in which the ratchet 14 is released from the engagement with the latch 12 when the sector gear 39 rotates (reversely rotates) in the other direction (anticlockwise direction in FIG. 5) from the neutral position. In the driving mechanism configured as described above, when the sector gear 39 normally rotates from the neutral position by a power of the motor 38, the automatic closing lever 21 of FIG. 2 is rotated, the latch 12 is rotated in the full latch direction, the full latch engagement portion 19 of the latch 12 and the claw part 14*a* of the ratchet 14 engage with each other, and a closed-door state is achieved. Further, when the sector gear 39 reversely rotates from the neutral position, the ratchet lever 24 of FIG. 2 is rotated, the ratchet 14 separates from the latch 12, and the openable state is achieved.

In this embodiment, two types of neutral position of the sector gear 39 are present, which are a neutral position in an open-door state and a neutral position in a closed-door state, in relation with a gear interlocking cam body 40 that turns a driving side switch group ON or OFF, the gear interlocking cam body 40 being the gist of the present application.

Figure 8:
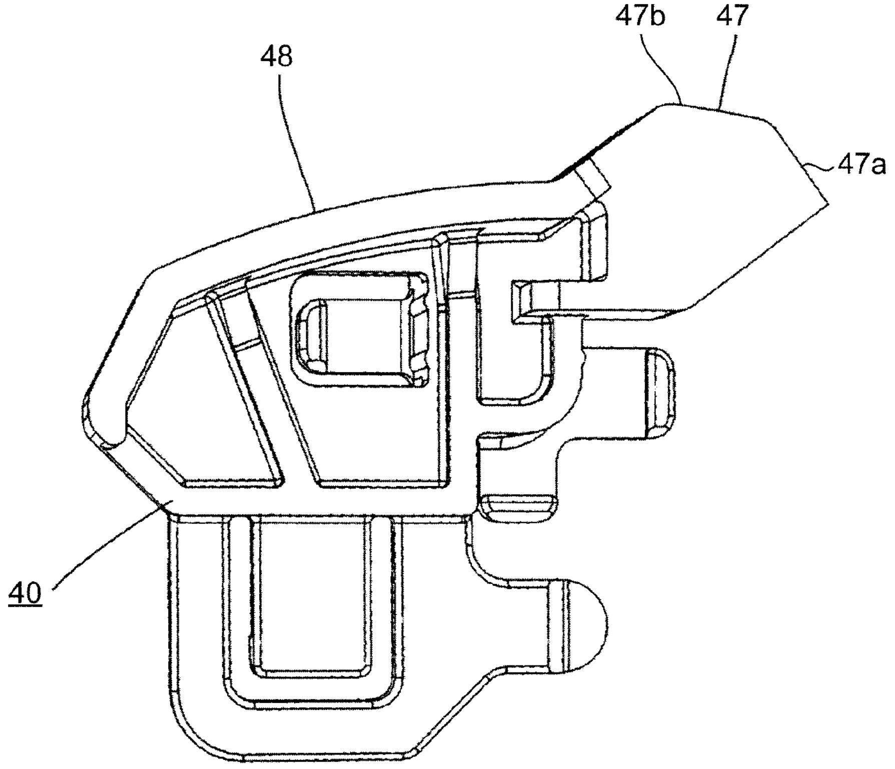
FIG. 8 is an enlarged view of the gear interlocking cam body.

The gear interlocking cam body 40 as illustrated in FIG. 8 is attached to the sector gear 39 of this embodiment. The gear interlocking cam body 40 rotates about the sector shaft 50 integrally with the sector gear 39. On a peripheral surface of the gear interlocking cam body 40, a first cam surface 47 and a second cam surface 48 are formed along a circumferential direction of the gear interlocking cam body 40. The first cam surface 47 is configured to have a right side surface 47*a* that is flat and a left side surface 47*b* that is adjacent to this right side surface 47*a* and that is flat. The first cam surface 47 is configured to be mountain-shaped when viewed from the front with the right side surface 47*a* and the left side surface 47*b*, and an apex thereof is formed to be obtuse-angled. The second cam surface 48 is linked to and starts from an end of the first cam surface 47. Specifically, the second cam surface 48 extends from a left end of the left side surface 47*b* of the first cam surface 47 towards the left in FIG. 5. The second cam surface 48 is configured to have a curved surface. This curved surface has an arc shape centering around the sector shaft 50 when viewed from the front.

Figure 6:
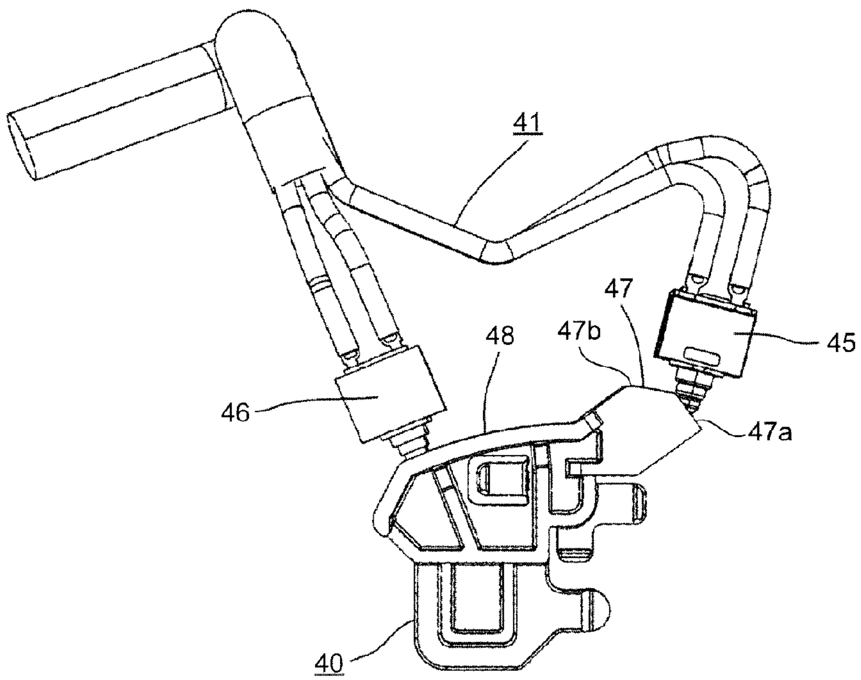
FIG. 6 is a front view illustrating the gear interlocking cam body and a switch assembly of a driving side switch group.
Figure 7:
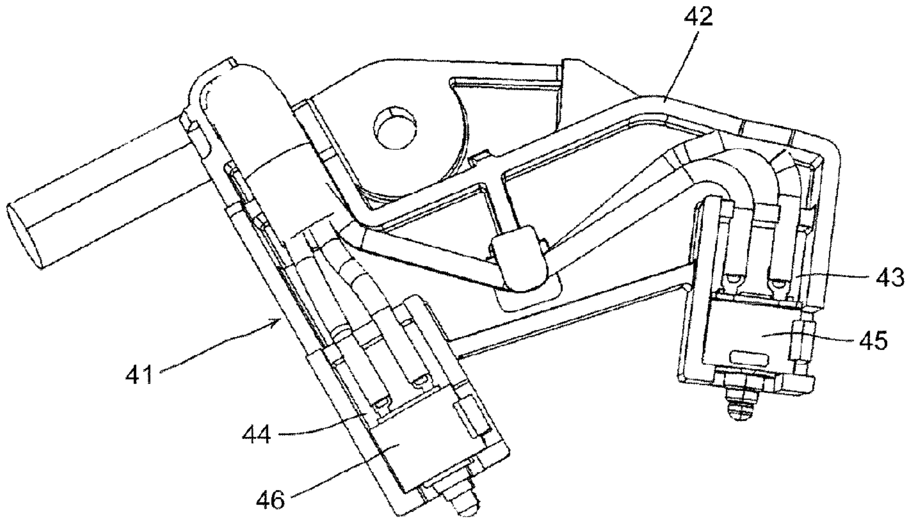
FIG. 7 is a front view illustrating the switch assembly of the driving side switch group.

In the vicinity of the gear interlocking cam body 40, as illustrated in FIG. 6, a switch assembly 41 that is the driving side switch group is provided. The switch assembly 41 includes a switch case 42 (not illustrated in FIG. 6 but see FIG. 7) and a neutral switch 45 and a gear detection switch 46, which are installed in this switch case 42. The switch case 42 is made of, for example, a synthetic resin. The switch case 42 (FIG. 7) is fixed to a base plate or the like (not illustrated) of the driving mechanism by a fixing means, such as a screw. Two switch accommodating portions 43 and 44 are integrally formed with the switch case 42. The neutral switch 45 is accommodated in the switch accommodating portion 43 and the gear detection switch 46 is accommodated in the switch accommodating portion 44, to be separately manufactured as the switch assembly 41.

The neutral switch 45 is configured to be turned ON by coming into contact with the mountain-shaped first cam surface 47 of the gear interlocking cam body 40. The neutral switch 45 is kept in the ON state by being in contact with the right side surface 47*a* of the first cam surface 47 as illustrated in FIG. 6 in an initial state of the open-door state (see, simultaneously, FIG. 9). This state is the neutral position of the sector gear 39 in the open-door state. When the door closing operation is started from the state of FIG. 6 by the activation of the automatic closing mechanism 23, the sector gear 39 is rotated in the clockwise direction in FIG. 5, the neutral switch 45 is kept in the ON state until the neutral switch 45 goes over the apex of the first cam surface 47 and is released from a contact with the left side surface 47*b* of the first cam surface 47, and the neutral switch 45 is switched OFF when the neutral switch 45 is released from a contact with the left side surface 47*b*. The switch assembly 41 of this embodiment is configured such that the second cam surface 48 does not come into contact with the neutral switch 45.

The gear detection switch 46 is configured to be turned ON by coming into contact with the second cam surface 48, which is a continuous single arc surface of the gear interlocking cam body 40. The gear detection switch 46 is in contact with a left end portion of the second cam surface 48 as illustrated in FIG. 6 and is kept in the ON state in the initial state of the open-door state (see FIG. 9). When the door closing operation is started from the state of FIG. 6 by the activation of the automatic closing mechanism 23, the sector gear 39 is rotated in the clockwise direction in FIG. 5 and the gear detection switch 46 is immediately switched OFF by being released from the contact with the second cam surface 48. That is, in this embodiment, after the start of the door closing operation by the activation of the automatic closing mechanism 23, a duration of the ON state of the gear detection switch 46 is caused to be shorter than a sustaining time period of the ON state of the neutral switch 45. The neutral switch 45 and the gear detection switch 46 are both switched over from ON to OFF after the start of the door closing operation by the activation of the automatic closing mechanism 23, but at this stage, control based on this signal switch-over is not performed. However, the immediate switch-over of the gear detection switch 46 from ON to OFF because of the gear detection switch 46 having been positioned at the left end portion of the second cam surface 48 is an important matter related to the gist of the present application, as described later.

The closing operation by the activation of the automatic closing mechanism 23 will now be described. By a door moving in a door closing direction, the striker 15 comes into contact with the latch 12 to rotate the latch 12 in the full latch direction. When the half latch engagement portion 18 of the latch 12 passes the claw part 14*a* of the ratchet 14, the ratchet 14 is rotated in the clockwise direction in FIG. 1 by the spring elastic force. By the rotation of the ratchet 14 in the clockwise direction, the ratchet switch 32 comes into contact with the ratchet switch lever 36 to be turned ON, and a half latch state is detected system-wise. When the ratchet switch 32 is turned ON, the automatic closing mechanism 23 is activated and the door closing operation is started. When the door closing operation is started by the activation of the automatic closing mechanism 23, the sector gear 39 is rotated in the clockwise direction in FIG. 5 by a power of the motor 38. When the sector gear 39 is rotated in the clockwise direction, first, the second cam surface 48 is released from the contact with the gear detection switch 46 and the gear detection switch 46 is turned OFF, and subsequently, the first cam surface 47 is released from the contact with the neutral switch 45 and the neutral switch 45 is turned OFF (the gear detection switch 46 does not contact with the second cam surface 48 that is depressed).

After the half latch state is detected, by the operation of the automatic closing mechanism 23 being continued, the latch 12 is rotated in the full latch direction, the cam surface 35 of the latch switch lever 20 comes into contact with the half latch switch 33 to turn the half latch switch 33 ON, and subsequently, the full latch switch 34 is turned ON by coming into contact with the cam surface 35. After the half latch switch 33 is turned ON and before the full latch switch 34 is switched ON, the ratchet 14 is pushed back in the door opening direction (anticlockwise direction in FIG. 1) against the spring elastic force by the contact with a side surface (peripheral surface) of the latch 12. By this rotation of the ratchet 14 in the anticlockwise direction, the ratchet switch 32 is released from the contact with the ratchet switch lever 36 and turned OFF. When the full latch engagement portion 19 of the latch 12 passes the claw part 14*a* of the ratchet 14, the ratchet 14 is rotated in the clockwise direction in FIG. 1 by the spring elastic force again. By this rotation of the ratchet 14 in the clockwise direction, the ratchet switch 32 comes into contact with the ratchet switch lever 36 to be turned ON, and a full latch state is detected system-wise.

Figure 9:
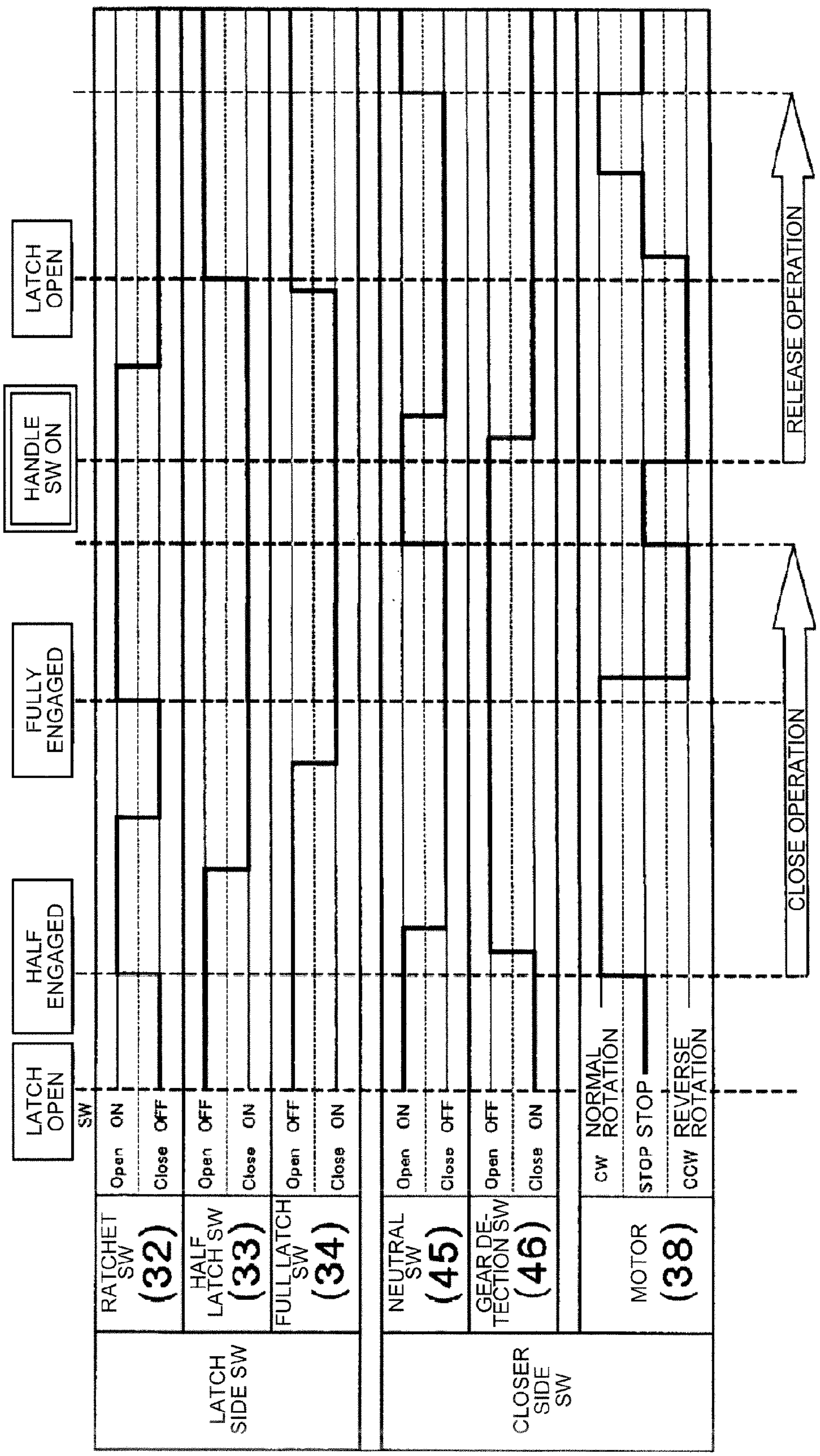
FIG. 9 is a time chart.

When the full latch state is detected, after some time lag for safety, the motor 38 is rotated reversely and the automatic closing mechanism 23 (sector gear 39) returns to neutral. This return to neutral is detected by the sector gear 39 being rotated in the anticlockwise direction in FIG. 5 by the reverse rotation of the motor 38 and the neutral switch 45 coming into contact with the left side surface 47*b* of the first cam surface 47 to be switched ON from OFF. The operation of the automatic closing mechanism 23 is ended by this return of the sector gear 39 to neutral. The state of FIG. 6 illustrates the neutral position of the sector gear 39 in the open-door state and the neutral switch 45 therein is ON by being in contact with the right side surface 47*a* of the first cam surface 47. After the door has been closed, the neutral switch 45 is turned ON by coming into contact with the left side surface 47*b* of the first cam surface 47. Such a state where the neutral switch 45 has been turned ON by the contact with the left side surface 47*b* of the first cam surface 47 is the neutral position in the closed-door state. In this state, the gear detection switch 46 is not in contact with the second cam surface 48. Accordingly, as illustrated in FIG. 9, the OFF-state of the gear detection switch 46 is continued even after the operation of the automatic closing mechanism 23 is ended.

The gear detection switch 46 is turned ON after the sector gear 39 is reversely rotated by the automatic releasing mechanism 25 (after the automatic releasing function is operated). After the automatic releasing function is operated and until the automatic closing function is operated, the ON state of the gear detection switch 46 is continued. Thus, in the closed-door state that is used overwhelmingly longer than the open-door state, the gear detection switch 46 is maintained in the OFF state.

Since, according to the above description of this embodiment, the operation of the automatic closing mechanism 23 is configured to be initiated from the switch-over of the ratchet switch 32 from OFF to ON, a timing to start the operation of the automatic closing mechanism 23 is clarified.

Further, when the automatic closing mechanism 23 is operated to close the door, the neutral switch 45 separates from the mountain-shaped first cam surface 47 of the gear interlocking cam body 40 to be switched over from ON to OFF, the gear detection switch 46 positioned at the left end portion of the second cam surface 48 is immediately released from the contact with the second cam surface 48 after the activation of the automatic closing mechanism 23 to be switched over from ON to OFF, and thus, particularly, a duration of the ON state of the gear detection switch 46 is able to be set short and improvement of the durability is able to be expected.

Further, since the gear detection switch 46 is configured to be turned ON by coming into contact with the second cam surface 48 for detecting the automatic releasing operation and is set to be turned ON only when the door is opened, an ON time period of the gear detection switch 46 is able to be set short and improvement of the durability is able to be expected, even further.

Further, since the second cam surface 48 that detects the automatic releasing operation with a rotation amount less than the rotation amount of the automatic closing operation is linked to the end of the left side surface 47*b* of the first cam surface 47, the gear interlocking cam body 40 is able to be downsized.

According to the present invention, since operation of an automatic closing mechanism is configured to be initiated by switch-over of a ratchet switch from OFF to ON, a timing to start the operation of the automatic closing mechanism is clarified, and as a result, in a short time period after operating the automatic closing mechanism, a gear detection switch is able to be separated from a second cam surface to be switched over from ON to OFF, an ON time period of the gear detection switch is able to be set short, and improvement of the durability is able to be expected.

Further, since the second cam surface that does not come into contact with a neutral switch is linked to an end of a first cam surface, a gear interlocking cam body is able to be downsized.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A driving device of a door latch unit, the driving device comprising:

a neutral switch that switches over from ON to OFF, when an automatic closing function by a motor is operated and a first earn surface, is released from a contact with the neutral switch; and a gear detection switch that switches over from, ON to OFF, when aft automatic closing function by the motor is operated and a second cam-surface is released from a contact with the gear detection switch, wherein the operation of the automatic closing function by the motor is configured to be initiated by switch-over of a ratchet switch of the door latch unit from OFF to ON, the operation of the automatic closing function by the motor is configured to be ended by switch-over of the neutral switch from, OFF to ON, the gear detection switch is configured to switch over from OFF to ON by coming into contact with the second cam surface again when the automatic releasing function by the motor Is operated, and the first cam surface and the second cam surface form a continuous surface in a circumferential direction, wherein the second cam surface is set at a height where the second cam surface does not come Into contact with the neutral switch and the second earn surface extends from an end portion of the first cam surface.

* * * * *